US012620227B2

(12) United States Patent
Lee et al.

(10) Patent No.: US 12,620,227 B2
(45) Date of Patent: May 5, 2026

(54) COMMON ACTION LOCALIZATION

(71) Applicant: QUALCOMM Incorporated, San Diego, CA (US)

(72) Inventors: Juntae Lee, Seoul (KR); Mihir Jain, Zürich (CH); Sungrack Yun, Gyeonggi-do (KR)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 18/360,741

(22) Filed: Jul. 27, 2023

(65) Prior Publication Data

US 2024/0303987 A1 Sep. 12, 2024

Related U.S. Application Data

(60) Provisional application No. 63/450,924, filed on Mar. 8, 2023.

(51) Int. Cl.
*G06K 9/62* (2022.01)
*G06F 16/732* (2019.01)
(Continued)

(52) U.S. Cl.
CPC .......... *G06V 20/48* (2022.01); *G06F 16/7328* (2019.01); *G06F 16/735* (2019.01); *G06F 16/75* (2019.01); *G06V 10/764* (2022.01); *G06V 20/41* (2022.01); *G06V 20/46* (2022.01); *G06V 10/82* (2022.01)

(58) Field of Classification Search
None
See application file for complete search history.

(56) References Cited

U.S. PATENT DOCUMENTS 9,361,523 B1 * 6/2016 Chen ...................... G06V 20/48
9,672,280 B2 * 6/2017 Liu ........................ G06F 16/739
(Continued)

FOREIGN PATENT DOCUMENTS

CN 115527152 A 12/2022
EP 2955645 B1 * 5/2017 .......... G06V 10/764
(Continued)

OTHER PUBLICATIONS

Yang et al., "Localizing the common action among a few videos." In European conference on computer vision, pp. 505-521. Cham: Springer International Publishing, 2020. (Year: 2020).*
(Continued)

*Primary Examiner* — Feng Niu
(74) *Attorney, Agent, or Firm* — ArentFox Schiff LLP

(57) ABSTRACT

Aspects of the disclosure are directed to an apparatus configured to perform common-action localization. In certain aspects, the apparatus may receive a query video comprising a plurality of frames, wherein a first query proposal is determined based on a subset of frames of the plurality of frames, the first query proposal indicative of an action depicted on the subset of frames. In certain aspects, the apparatus may determine a first attendance for a first support video of a plurality of support videos. In certain aspects, the apparatus may determine a second attendance for a second support video of the plurality of support videos after computing the first attendance.

30 Claims, 9 Drawing Sheets

(51) Int. Cl.

| | |
|---|---|
| *G06F 16/735* | (2019.01) |
| *G06F 16/75* | (2019.01) |
| *G06V 10/764* | (2022.01) |
| *G06V 20/40* | (2022.01) |
| *G06V 10/82* | (2022.01) |

(56) References Cited

U.S. PATENT DOCUMENTS

| | | | | |
|---|---|---|---|---|
| 10,210,252 | B2 * | 2/2019 | Pereira | G06T 7/162 |
| 10,839,223 | B1 * | 11/2020 | Jiang | G06V 20/46 |
| 11,281,718 | B2 * | 3/2022 | Pereira | G06F 16/71 |
| 11,734,287 | B2 * | 8/2023 | Sharifi | G06F 16/5866 |
| | | | | 707/728 |
| 12,210,564 | B2 * | 1/2025 | Majkowska | G06F 16/532 |
| 2007/0117627 | A1 * | 5/2007 | Raman | A63F 13/30 |
| | | | | 463/32 |
| 2015/0293996 | A1 * | 10/2015 | Liu | G06F 16/739 |
| | | | | 707/723 |
| 2015/0363660 | A1 * | 12/2015 | Vidal | G06V 10/764 |
| | | | | 382/173 |
| 2017/0068423 | A1 * | 3/2017 | Napolitano | G06F 40/40 |
| 2017/0192980 | A1 * | 7/2017 | Pereira | G06T 7/11 |
| 2017/0337271 | A1 * | 11/2017 | Lee | G06V 10/82 |
| 2020/0004781 | A1 * | 1/2020 | Pereira | G06T 7/12 |
| 2020/0159765 | A1 * | 5/2020 | Manin | G06N 3/02 |
| 2022/0156514 | A1 * | 5/2022 | Gavrilyuk | G06V 10/763 |
| 2022/0188321 | A1 * | 6/2022 | Sharifi | G06F 16/24578 |
| 2024/0134506 | A1 * | 4/2024 | Napolitano | G06F 16/483 |

FOREIGN PATENT DOCUMENTS

| | | | | | |
|---|---|---|---|---|---|
| WO | WO-2021169209 | A1 * | 9/2021 | | G06F 18/251 |
| WO | WO-2021221209 | A1 * | 11/2021 | | G06F 16/785 |
| WO | WO-2023000779 | A1 * | 1/2023 | | G06F 16/735 |

OTHER PUBLICATIONS

Gong et al., "Learning temporal co-attention models for unsupervised video action localization." In Proceedings of the IEEE/CVF conference on computer vision and pattern recognition, pp. 9819-9828. 2020. (Year: 2020).*

Liu et al., "Learning global pose features in graph convolutional networks for 3d human pose estimation." In Proceedings of the Asian conference on computer vision. 2020. (Year: 2020).*

Kim et al., "Efficient action recognition via dynamic knowledge propagation." In Proceedings of the IEEE/CVF International Conference on Computer Vision, p. 13719-13728. 2021. (Year: 2021).*

EP-2955645-B1 (machine translation) (Year: 2017).*

WO-2023000779-A1 (machine translation) (Year: 2023).*

International Search Report and Written Opinion—PCT/US2023/086100—ISA/EPO—Apr. 23, 2024.

Jain M., et al., "ActionBytes: Learning from Trimmed Videos to Localize Actions", 2020 IEEE/CVF Conference on Computer Vision and Pattern Recognition (CVPR), Jun. 13, 2020, pp. 1168-1177, XP033803437, abstract, figures 1, 2.

Tan S., et al., "Learning Similarity: Feature-Aligning Network for Few-shot Action Recognition", 2019 International Joint Conference on Neural Networks (IJCNN), IEEE, Jul. 14, 2019, 7 Pages, XP033621539, abstract, figures 1, 2.

Yang H., et al., "One-shot Action Localization by Learning Sequence Matching Network", 2018 IEEE/CVF Conference on Computer Vision and Pattern Recognition, Jun. 18, 2018, pp. 1450-1459, XP033476108, abstract, figures 1, 2.

Yang P., et al., "Few-Shot Transformation of Common Actions into Time and Space", 2021 IEEE/CVF Conference on Computer Vision and Pattern Recognition (CVPR), Jun. 20, 2021, pp. 16023-16035, XP034009773.

* cited by examiner

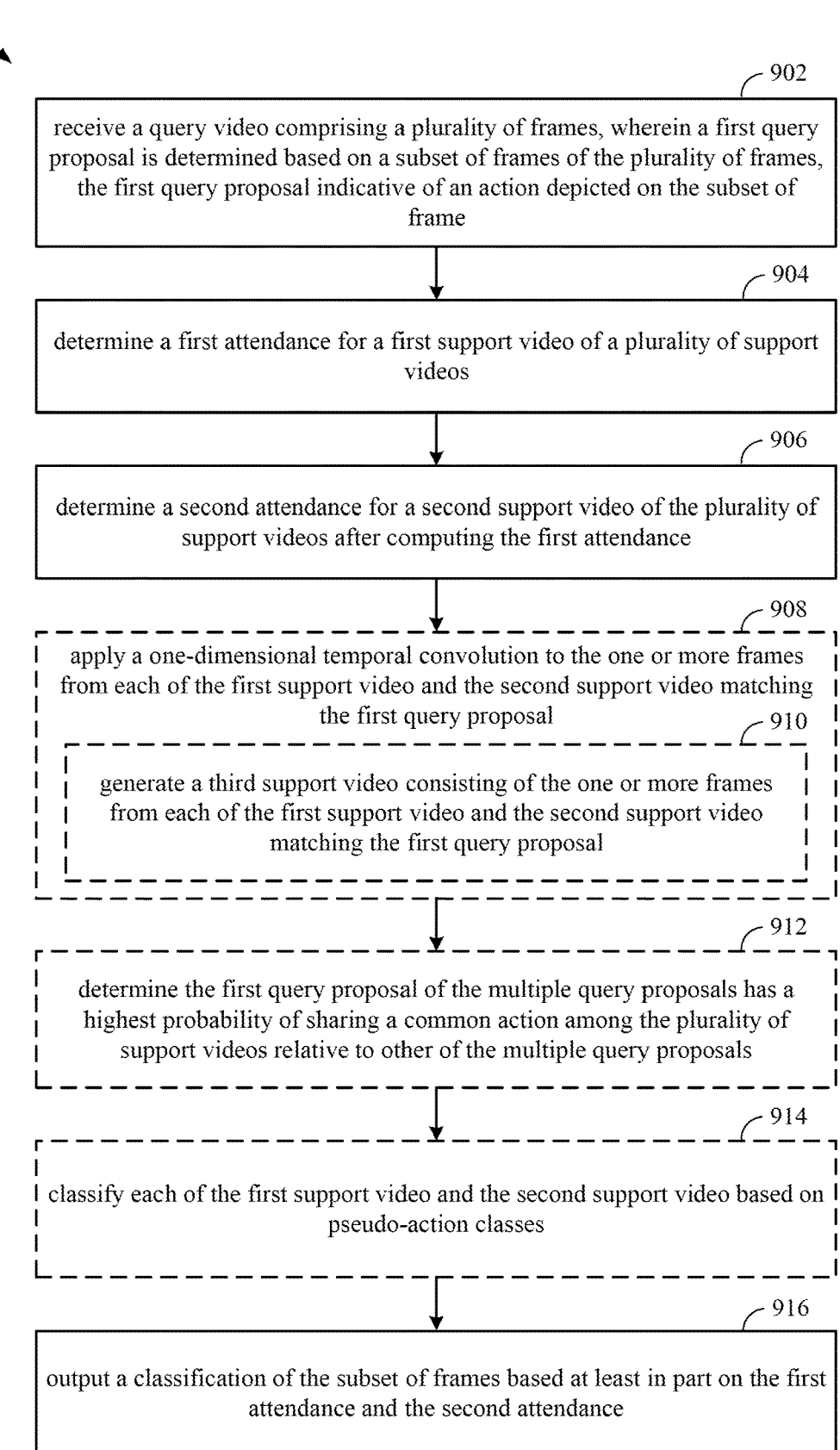

900

902 receive a query video comprising a plurality of frames, wherein a first query proposal is determined based on a subset of frames of the plurality of frames, the first query proposal indicative of an action depicted on the subset of frame

904 determine a first attendance for a first support video of a plurality of support videos

906 determine a second attendance for a second support video of the plurality of support videos after computing the first attendance

908 apply a one-dimensional temporal convolution to the one or more frames from each of the first support video and the second support video matching the first query proposal

910 generate a third support video consisting of the one or more frames from each of the first support video and the second support video matching the first query proposal

912 determine the first query proposal of the multiple query proposals has a highest probability of sharing a common action among the plurality of support videos relative to other of the multiple query proposals

914 classify each of the first support video and the second support video based on pseudo-action classes

916 output a classification of the subset of frames based at least in part on the first attendance and the second attendance

FIG. 9

COMMON ACTION LOCALIZATION

CROSS REFERENCE TO RELATED APPLICATION(S)

This application claims the benefit of U.S. Provisional Application Ser. No. 63/450,924, entitled "COMMMON ACTION LOCALIZATION" and filed on Mar. 8, 2023, the disclosure of which is expressly incorporated by reference herein in its entirety.

BACKGROUND

Technical Field

The present disclosure generally relates to machine learning and, more particularly, to improving systems and methods of action recognition and localization.

INTRODUCTION

An artificial neural network, which may include an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Computational networks such as recurrent neural networks may also be useful for recognizing sequences and other temporal data. However, such computational networks are computationally complex and consume significant compute resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for performing common-action localization. The apparatus may include one or more memories, individually or in combination, having instructions, and one or more processors, individually or in combination, configured to execute the instructions. In some examples, the one or more processors may be configured to cause the apparatus to receive a query video comprising a plurality of frames, wherein a first query proposal is determined based on a subset of frames of the plurality of frames, the first query proposal indicative of an action depicted on the subset of frames. In some examples, the one or more processors may be configured to cause the apparatus to determine a first attendance for a first support video of a plurality of support videos. In some examples, the one or more processors may be configured to cause the apparatus to determine a second attendance for a second support video of the plurality of support videos after computing the first attendance. In some examples, the one or more processors may be configured to cause the apparatus to output a classification of the subset of frames based at least in part on the first attendance and the second attendance.

Certain aspects are directed to a method for performing common-action localization. In some examples, the method includes receiving a query video comprising a plurality of frames, wherein a first query proposal is determined based on a subset of frames of the plurality of frames, the first query proposal indicative of an action depicted on the subset of frames. In some examples, the method includes determining a first attendance for a first support video of a plurality of support videos. In some examples, the method includes determining a second attendance for a second support video of the plurality of support videos after computing the first attendance. In some examples, the method includes outputting a classification of the subset of frames based at least in part on the first attendance and the second attendance.

Certain aspects are directed to an apparatus for performing common-action localization. In some examples, the apparatus includes means for receiving a query video comprising a plurality of frames, wherein a first query proposal is determined based on a subset of frames of the plurality of frames, the first query proposal indicative of an action depicted on the subset of frames. In some examples, the apparatus includes means for determining a first attendance for a first support video of a plurality of support videos. In some examples, the apparatus includes means for determining a second attendance for a second support video of the plurality of support videos after computing the first attendance. In some examples, the apparatus includes means for outputting a classification of the subset of frames based at least in part on the first attendance and the second attendance.

Certain aspects are directed to a non-transitory computer-readable medium comprising computer executable code, the code when executed by one or more processors causes the one or more processors to, individually or in combination, perform operations. In some examples, the operations include receiving a query video comprising a plurality of frames, wherein a first query proposal is determined based on a subset of frames of the plurality of frames, the first query proposal indicative of an action depicted on the subset of frames. In some examples, the operations include determining a first attendance for a first support video of a plurality of support videos. In some examples, the operations include determining a second attendance for a second support video of the plurality of support videos after computing the first attendance. In some examples, the operations include outputting a classification of the subset of frames based at least in part on the first attendance and the second attendance.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart illustrating a method of performing common-action localization.

DETAILED DESCRIPTION

Figure 1:
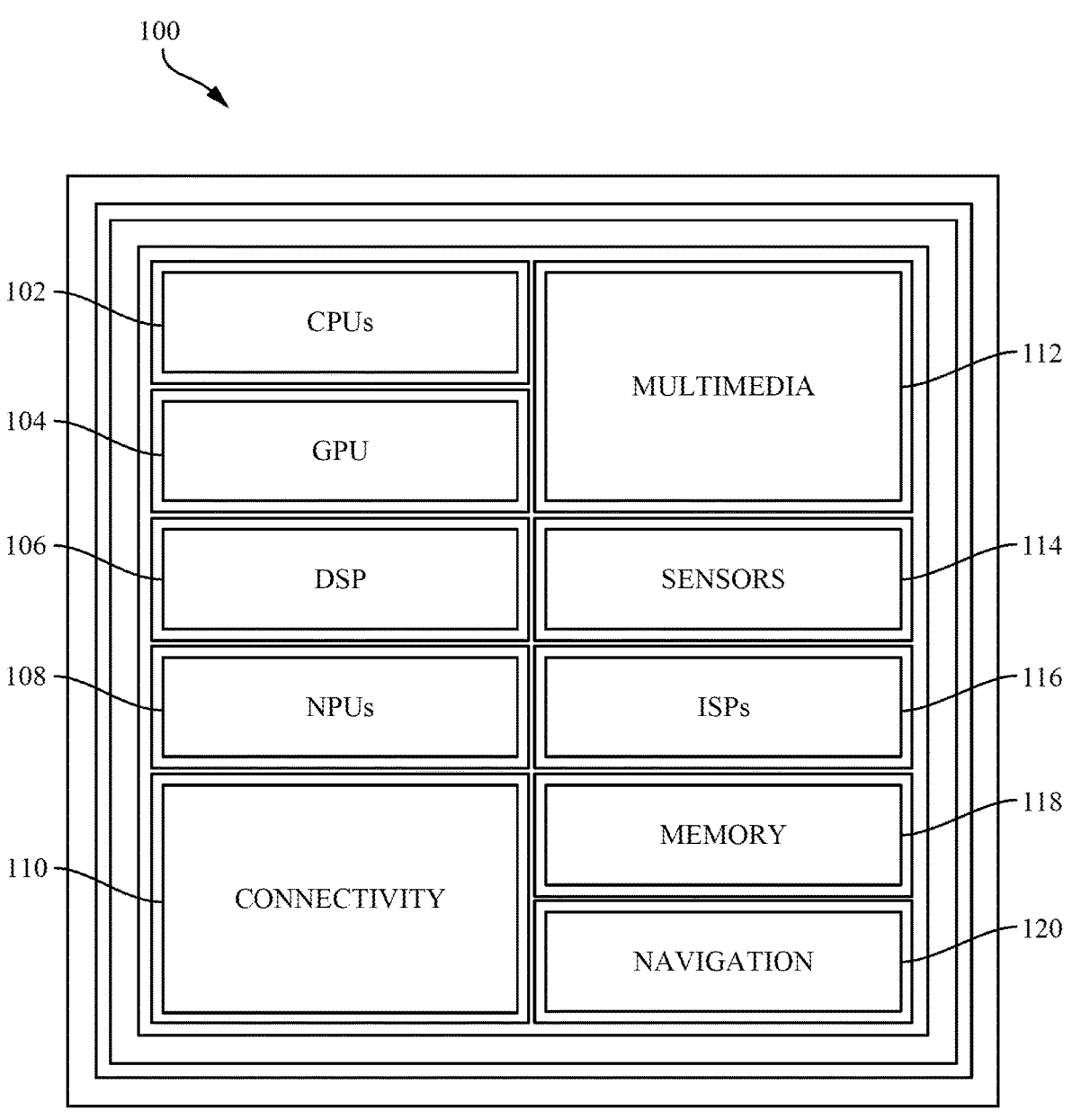
FIG. 1 illustrates an example implementation of designing a neural network using a system-on-a-chip (SoC), including a general-purpose processor in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the disclosure relate to individual cross-attention of a query proposal for each support video. Typically, there are relatively large intra-class variation across support videos. For example, support videos may have different backgrounds, different illumination, camera angles, etc. Thus, finding one or more frames of a support video that match the action of a query video requires a more refined approach than what is conventionally used. Conventionally, attention of a query proposal is determined using the frames of multiple support videos simultaneously. As a result, frames from one support video that match the action of the query video may not be attended by the query proposal.

As such, aspects of the disclosure are directed to techniques and methods of determining or computing attention for the frames of one support video, at a time instead of simultaneously. Accordingly, frames of each support video that match the action of the query video are appropriately identified in the context of the query.

In certain aspects, a neural network apparatus (e.g., a system on a chip) may receive a query video comprising a plurality of frames, wherein a first query proposal is determined based on a subset of frames of the plurality of frames, and wherein the first query proposal is indicative of an action depicted on the subset of frames. For example, the query video may include multiple frames with a subset of one or more of the multiple frames depicting an action, such as deadlifting weights as part of a weight training regimen. The apparatus may then determine a first attendance for a first support video of a plurality of support videos. That is, the apparatus may determine which one or more frames of the first support video are likely to depict deadlifting.

Once the apparatus has completed the first attendance for the first support video, the apparatus may determine a second attendance for a second support video. Here, the apparatus may determine which one or more frames of the second support video are likely to depict deadlifting. Thus, the apparatus computes attendance for each support video separately or in series instead of in parallel.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that can be used to store computer executable code in the form of instructions or data structures that can be accessed by a computer. In some aspects, computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

FIG. 1 illustrates an example implementation of the aforementioned action localization using a system-on-a-chip (SoC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SoC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114, image signal processors (ISPs) 116, and/or navigation 120, which may include a global positioning system.

The SoC 100 may be based on an ARM instruction set. In an aspect of the present disclosure, the instructions loaded into the general-purpose processor 102 may comprise code for receiving a sequence of frames. The instructions loaded into the general-purpose processor 102 may also comprise code for generating an attention feature map for each frame of the sequence of frames. The instructions loaded into the general-purpose processor 102 may further comprise code for up-sampling each attention feature map to determine an attention saliency for pixels in each frame. The instructions loaded into the general-purpose processor 102 may still further comprise code for generating a bounding-box within each frame based on the attention saliency. Furthermore, the instructions loaded into the general-purpose processor 102 may also comprise code for generating a bounding-box within each frame based on the attention saliency. Additionally, the instructions loaded into the general-purpose processor 102 may further comprise code for temporally smoothing multiple bounding-boxes along the sequence of frames to obtain a smooth sequence of bounding-boxes. Finally, the instructions loaded into the general-purpose processor 102 may further comprise code for localizing an action location within each frame based on the smooth sequence of bounding-boxes.

Figure 2:
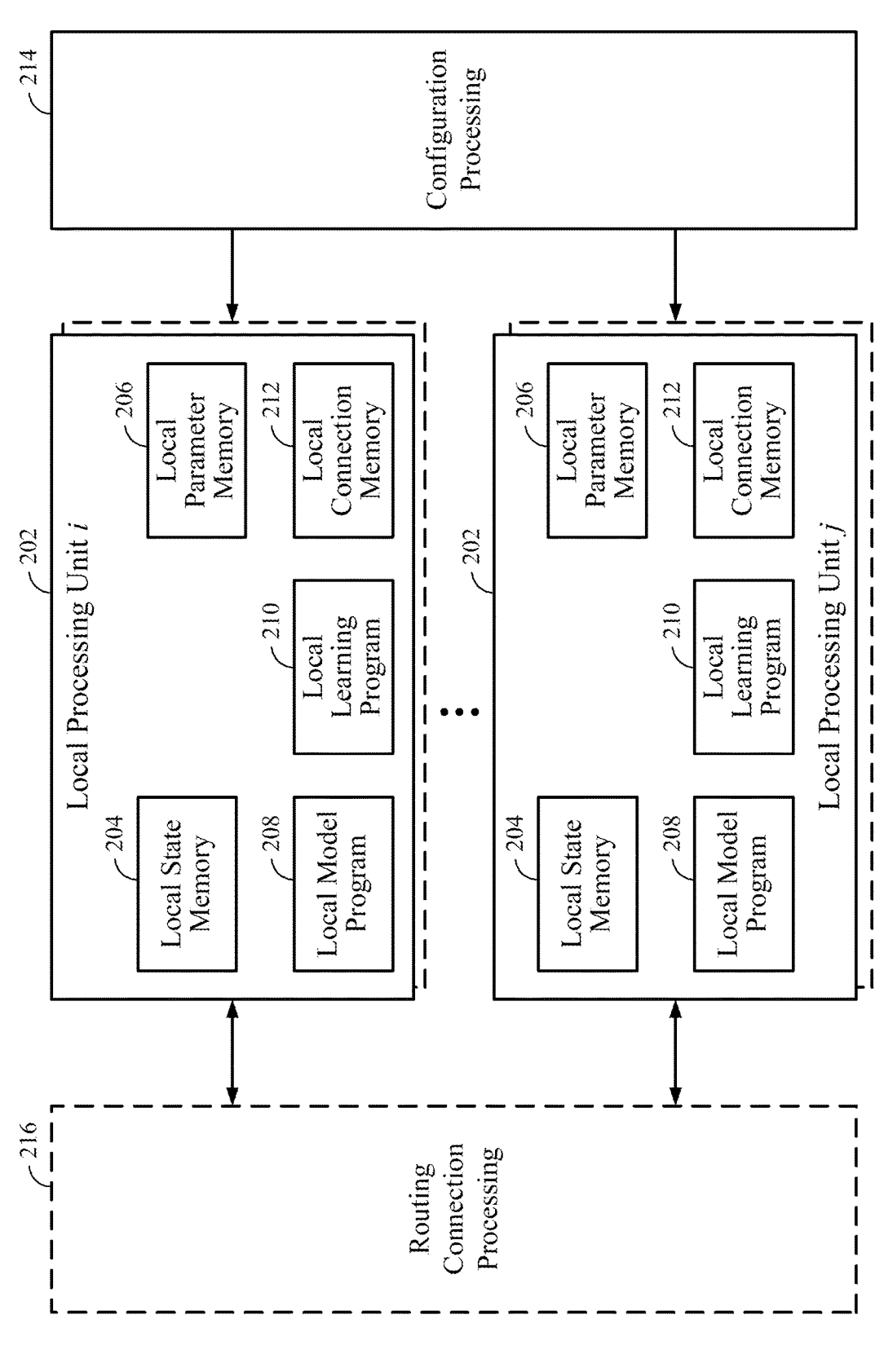
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

In one configuration, a processing model is configured for receiving the sequence of frames, generating a attention feature map for each frame of the sequence of frames; up-sampling each attention feature map to determine an attention saliency for pixels in each frame; generating a bounding-box within each frame of the sequence of frames based on the attention saliency; temporally smoothing multiple bounding-boxes along the sequence of frames to obtain a smooth sequence of bounding-boxes; and localizing an action location within each frame of the sequence of frames based on the smooth sequence of bounding-boxes. The model includes a generating means, up-sampling means, localizing means, and/or temporally smoothing means. In one configuration, the generating means, localizing means, and/or temporally smoothing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3:
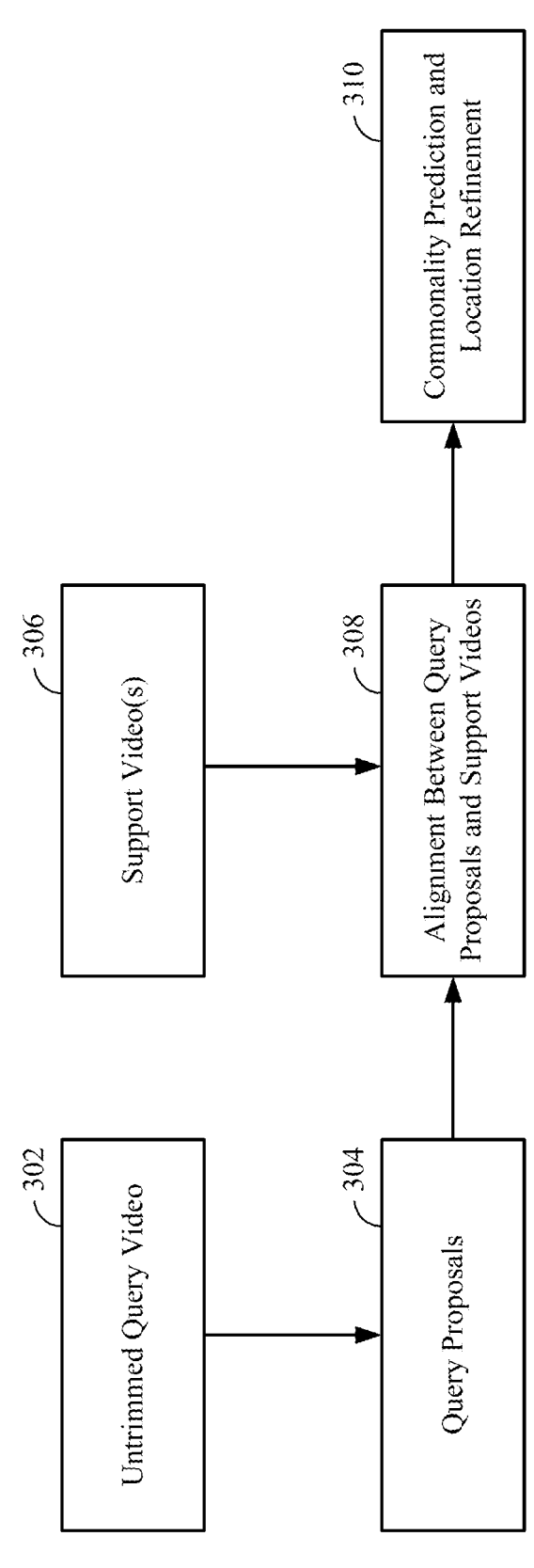
FIG. 3 is a block diagram illustrating an example process for common-action localization.

FIG. 3 is a block diagram illustrating an example process 300 for common-action localization. At a first block 302, at least one processor may receive an untrimmed query video. That is, the video may be an unedited video (e.g., a complete set of frames) including content related to multiple different actions. For example, the video may include frames depicting content relating to an individual performing a deadlift weight-training exercise, while other frames may depict other actions (e.g., different weight-training exercises, resting periods, etc.).

At a second block 304, the at least one processor may generate multiple query proposals, wherein each query proposal is indicative of a proposed action classifier. For example, the multiple query proposals may be determined based on the multiple different actions depicted in the query video. In some examples, a neural network may determine the multiple query proposals.

At a third block 306, the at least one processor may receive multiple support videos. In some examples, the support videos do not include any action label or identifier of an action depicted within them. The support videos may be trimmed videos, meaning that the support videos may only depict a single action, or fewer actions than the query video.

At a fourth block 308, the at least one processor may determine alignment between one or more of the query proposals and the support videos. For example, if a first query proposal is "deadlifting" and the at least one processor determines that a first support video depicts deadlifting, then the at least one processor may determine that the first support video is aligned (e.g., common) to the first query proposal.

At a fifth block 310, the at least one processor may determine one or more of the query proposals that are most common to the support videos. For example, the at least one processor may classify each query proposal as either common among the support videos or not common among the support videos. If the query proposal is classified as a common, then the query proposal is detected as an action that is common with the query video, and/or is an action common between the query video and a support video. The at least one processor may also define each start and end times of the common action within the query video. For example, the at least one processor may determine one or more time windows of the query video that depict the common action.

In some examples, the fourth block 308 may include query-to-support (QtoS) context cross-attention and support-to-support temporal dynamic cross-attention, as described in more detail below.

Figure 4:
FIG. 4 is a block diagram illustrating an example process flow for common-action localization.

FIG. 4 is a block diagram illustrating an example process flow 400 for common-action localization. The process flow 400 is illustrated as including three separate processes: a first process 402, a second process 404, and a third process 406. The first process 402 and the second process 404 may correspond to the fourth block 308 of FIG. 3. The third process 406 may correspond to the fifth block 310 of FIG. 3.

At the first process 402, a set of query proposals ($X_Q$) and an $l^{th}$ support video $$\left(X_S^l\right)$$

are inputs. Each query proposal is a potential action instance depicted in the untrimmed query video ($V_Q$). Using the query proposals and each support video, a cross-attention weight $$\left(A_{Q \to S}^{(l)}\right)$$

(from query to support)) is applied to each pair of query proposal and support video by determining a row-wise soft maximum of the cross-correlation matrix. For example, cross correlation may be performed using the following equation:

$$A_{Q \to S}^{(l)} = X_Q^T W_{Q \to S} X_S^{(l)} \qquad \text{Equation 1}$$

Where $W_{Q \to S}$ is a learnable matrix shared for all L support videos. The result are cross attenuated frame-level features $$\left(\tilde{X}_S^{(l)}\right)$$

for the $l^{th}$ support video, where $$\tilde{X}_S^{(l)}$$

is defined as follows:

$$\tilde{X}_S^{(l)} = X_Q A_{Q \to S}^{(l)} + X_S^{(l)} \qquad \text{Equation 2}$$

Accordingly, $$\tilde{X}_S^{(l)}$$

is obtained for all L support videos, individually $$\left(\left\{\tilde{X}_S^{(l)}\right\}_{l=1}^L\right).$$

Figure 5:
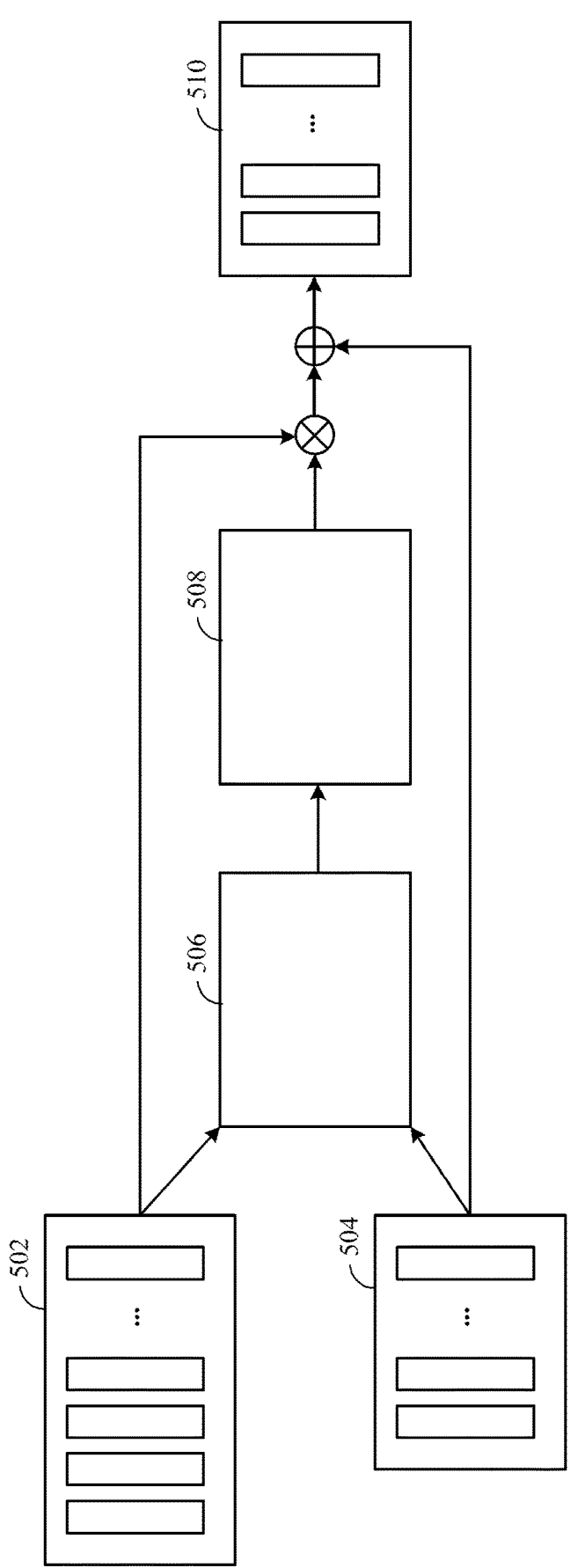
FIG. 5 is a block diagram illustrating an example flow process for the first process of FIG. 4.

FIG. 5 is a block diagram illustrating an example flow process for the first process 402 of FIG. 4. The block diagram includes the set of query proposals ($X_Q$) 502, the $l^{th}$ support video $$\left(X_S^l\right)$$

504, the learnable matrix ($W_{Q \to S}$) 506, the cross-attention weight $$\left(A_{Q \to S}^{(l)}\right)$$

508 and the resulting cross attenuated frame-level features $$\left(\tilde{X}_S^{(l)}\right)$$

510.

In certain aspects, first process 402 of FIG. 4 may compute attention (e.g., degree of relevance a query proposal has to the support video) for the frames of one support video at a time. That is, instead of only a dominant segment of a first support video getting attention while other support videos are suppressed, all frames of all the support videos are attended. Accordingly, important frames of each support video are appropriately transformed to the context of the query.

Referring back to FIG. 4, the second process 404 may apply a one-dimensional temporal convolution on a frame-level. For example, tuple-level features (e.g., all support videos) and frame-level features (e.g., individual support video) can together convey a more robust video representation. That is, cross-attention can provide collaborative use of features in different temporal granularity. Also, for compatibility among different support videos (e.g., for commonality extraction), the temporal dynamics from all the support videos may be propagated to an individual support video comprising resulting attenuated support frame-level features $$\left(\left\{\hat{Y}_S^{(l)}\right\}_{l=1}^L\right).$$

Thus, $$\hat{Y}_S^{(l)}$$

is obtained for all the support videos, individually.

Figure 6:
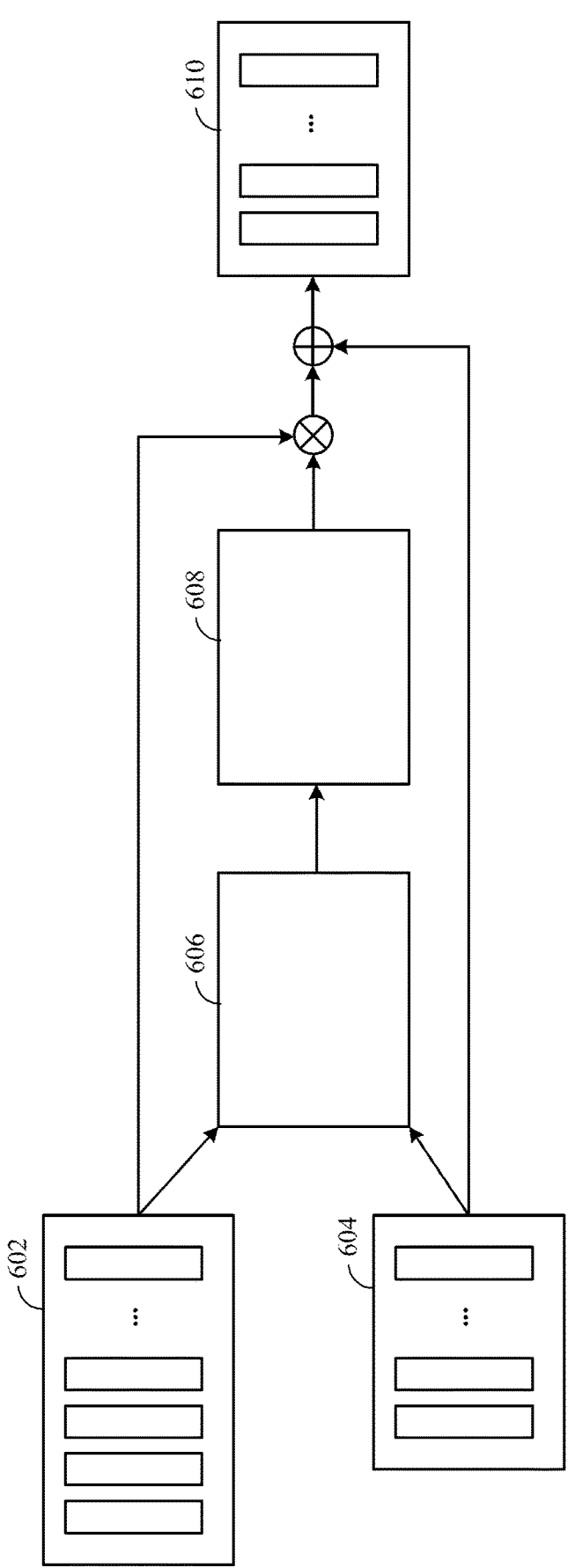
FIG. 6 is a block diagram illustrating an example flow process for the second process of FIG. 4.

FIG. 6 is a block diagram illustrating an example flow process for the second process 404 of FIG. 4. The block diagram includes the cross-attenuated frame-level features for all the L support videos $$\left(\left\{\tilde{X}_{S'}^{(l)}\right\}_{l=1}^L\right)$$

602, the cross attenuated frame-level features $$\left(\tilde{X}_S^{(l)}\right)$$

604, a learnable matrix $(W_{S' \to S})$ 606, a cross-attention weight $$\left(A_{S' \to S}^{(l)}\right)$$

608 and the resulting attenuated support frame-level features $$\left(\hat{Y}_S^{(l)}\right)$$

610.

Figure 7:
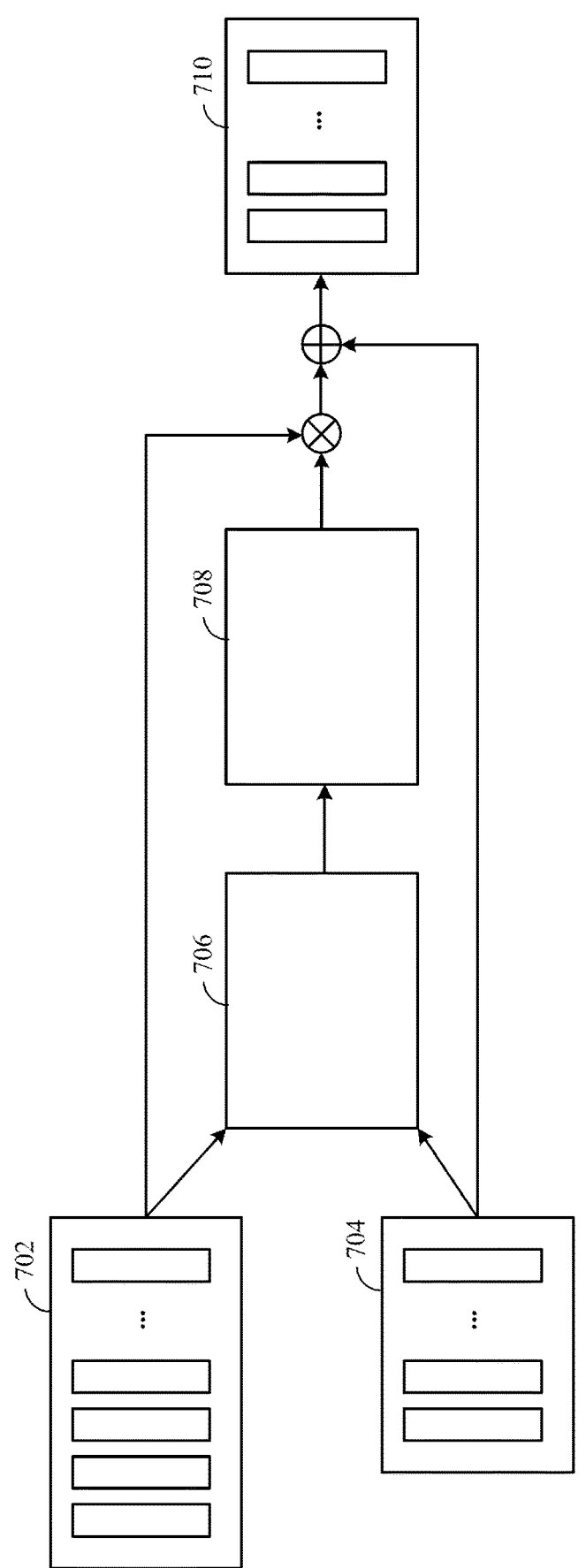
FIG. 7 is a block diagram illustrating an example flow process for the third process of FIG. 4.

Referring back to FIG. 4, the third process 406 may use all the support videos from first process 402 and the second process 404 to attend all query proposals, at once. Thus, cross-attenuation is used to generate an enhanced query proposal $(\tilde{X}_Q)$. FIG. 7 is a block diagram illustrating an example flow process for the third process 406 of FIG. 4. Here, the set of query proposals $(X_Q)$ 702 and the attenuated support frame-level features $$\left(\left\{\hat{Y}_S^{(l)}\right\}_{l=1}^L\right)$$

704 are input to a learnable matrix $(W_{S \to Q})$ 706 with a cross-attention weight $(A_{S \to Q})$ 708 applied, and the resulting enhanced query proposal $(\tilde{X}_Q)$ 710. The enhanced query proposal $(\tilde{X}_Q)$ 710 may be output to a relational classifier 408.

Figure 8:
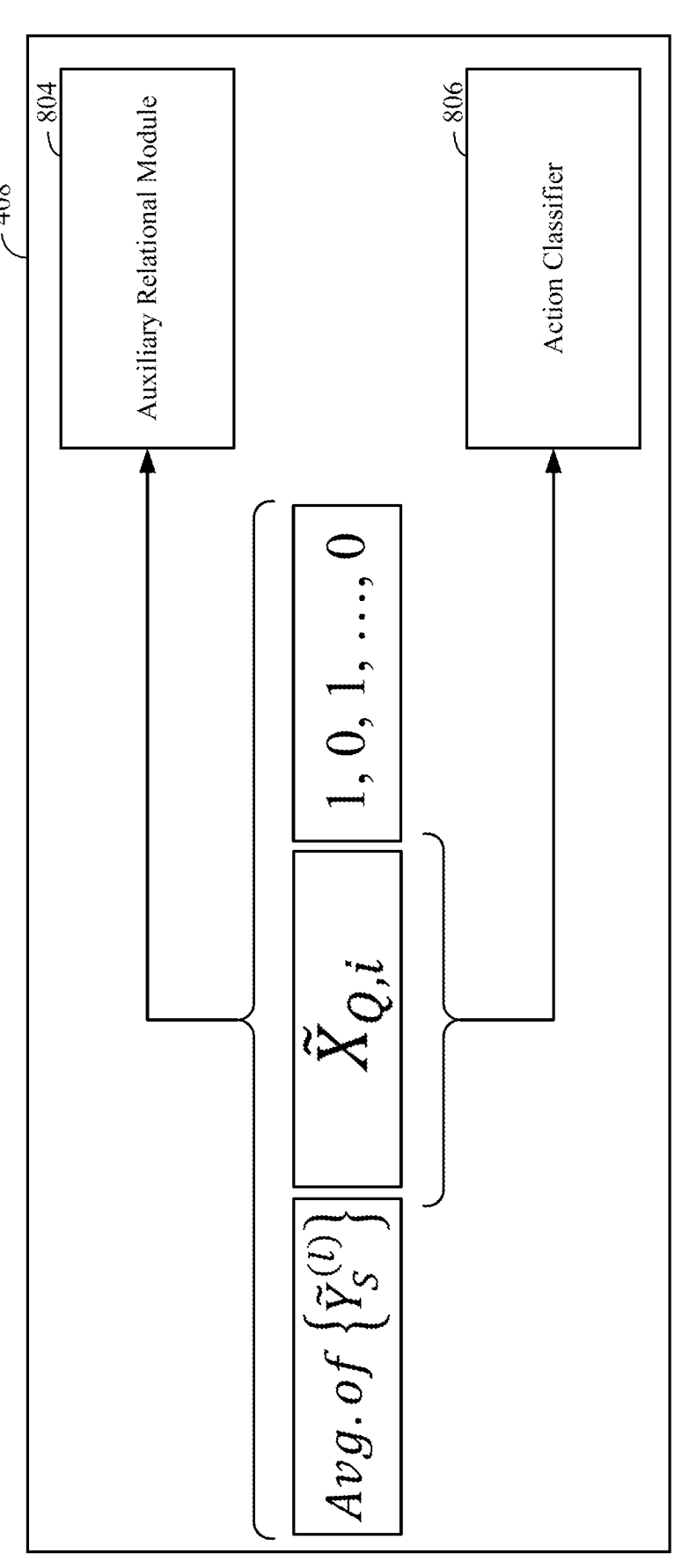
FIG. 8 is a block diagram illustrating an example of the relational classifier.

FIG. 8 is a block diagram illustrating an example of the relational classifier 408 illustrated in FIG. 4. The relational classifier 408 may include an auxiliary relational module 804 and an action classifier 806.

The auxiliary relational module 804 may take, as inputs, the enhanced query proposal (e.g., an ith enhanced query proposal 710 of FIG. 7 $(\tilde{X}_{Q,i})$) concatenated with average of all the support video features (e.g., avg. of $$\hat{Y}_S^{(l)}$$

610 of FIG. 6), and a pseudo action class indicator (e.g., 0/1). Pseudo action classes may not relate to a true action class even in training. Instead, the pseudo action class may be obtained by k-means clustering of the enhanced query proposal. For example, the mapped k-means cluster may be the pseudo action class of a query proposal. In some examples, the pseudo action class indicator may be a 1 or 0, wherein 1 is for a pseudo action class, and 0 otherwise. The auxiliary relational module 804 may output a prediction of whether the support videos and query proposal is similar or non-similar.

The action classifier 806 may take as an input an ith enhanced query proposal $(\tilde{X}_{Q,i})$ weighted by the distance between support videos and the proposed query. The action classifier 806 may output: (1) action or non-action probabilities, and (2) offsets (refinement values for start and end times of the query proposal, for correct localization). The offsets may be used when the action probability is higher than 0.5.

As post processing, final localization is conducted over the predicted and refined action proposals. For overlapped proposals, the proposal with the highest action probability may be used, and the remaining proposals removed.

FIG. 9 is a flowchart 900 illustrating a method of performing common-action localization. The method may be performed by one or more processors (e.g., the CPU 102 in FIG. 1, the GPU 104 in FIG. 1, the DSP 106 in FIG. 1, the NPU 108 in FIG. 1, etc.).

At 902, the one or more processors may receive a query video comprising a plurality of frames, wherein a first query proposal is determined based on a subset of frames of the plurality of frames, the first query proposal indicative of an action depicted on the subset of frame. For example, an apparatus (e.g., the one or more processors) may receive a query video comprising a plurality of frames, wherein a first query proposal is determined based on a subset of frames of the plurality of frames. The first query proposal may be indicative of an action depicted on the subset of frames.

At 904, the one or more processors may determine a first attendance for a first support video of a plurality of support videos. In some examples, attendance relates to an importance of one or more frames of a support video. For example, a frame attendance may indicate an action probability that a proposed action is found in a particular frame of a support video.

At 906, the one or more processors may determine a second attendance for a second support video of the plurality of support videos after computing the first attendance.

At 908, the one or more processors may optionally apply a one-dimensional temporal convolution to the one or more frames from each of the first support video and the second support video matching the first query proposal. The one or more processors may also optionally generate a third support video consisting of the one or more frames from each of the first support video and the second support video matching the first query proposal at 910.

At 912, the one or more processors may determine the first query proposal of the multiple query proposals has a highest probability of sharing a common action among the plurality of support videos relative to other of the multiple query proposals.

At 914, the one or more processors may classify the each of the first support video and the second support video based on pseudo-action classes.

At 916, the one or more processors may output a classification of the subset of frames based at least in part on the first attendance and the second attendance.

In certain aspects, the second attendance is determined independent of the first attendance.

In certain aspects, the first attendance is indicative of whether the first support video comprises one or more frames matching the first query proposal, and wherein the second attendance is indicative of whether the second support video comprises one or more frames matching the first query proposal.

In certain aspects, the pseudo-action classes are mapped to a k-means cluster.

ADDITIONAL CONSIDERATIONS

Means for receiving and means for outputting may include a connectivity block (e.g., the connectivity block 110 illustrated in FIG. 3) or interconnections (e.g., busses) within the SoC. Means for determining, means for applying, means for generating, and means for classifying may include a one or more of a CPU (e.g., CPUs 102 of FIG. 1) and a digital storage device (e.g., memory block 118 of FIG. 1).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following examples are illustrative only and may be combined with aspects of other embodiments or teachings described herein, without limitation.

Example 1 is a method for performing common-action localization, comprising: receiving a query video comprising a plurality of frames, wherein a first query proposal is determined based on a subset of frames of the plurality of frames, the first query proposal indicative of an action depicted on the subset of frames; determining a first attendance for a first support video of a plurality of support videos; determining a second attendance for a second support video of the plurality of support videos after computing the first attendance; and outputting a classification of the subset of frames based at least in part on the first attendance and the second attendance.

Example 2 is the method of example 1, wherein the second attendance is determined independent of the first attendance.

Example 3 is the method of any of examples 1 and 2, wherein the first attendance is indicative of whether the first support video comprises one or more frames matching the first query proposal, and wherein the second attendance is indicative of whether the second support video comprises one or more frames matching the first query proposal.

Example 4 is the method of example 3, wherein the method further comprises: applying a one-dimensional temporal convolution to the one or more frames from each of the first support video and the second support video matching the first query proposal.

Example 5 is the method of any of examples 3 and 4, wherein the method further comprises: generating a third support video consisting of the one or more frames from each of the first support video and the second support video matching the first query proposal.

Example 6 is the method of any of examples 1-5, wherein the first query proposal is one of multiple query proposals determined based on the plurality of frames, and wherein the method further comprises: determining the first query proposal of the multiple query proposals has a highest probability of sharing a common action among the plurality of support videos relative to other of the multiple query proposals.

Example 7 is the method of any of examples 1-6, wherein the method further comprises: classifying each of the first support video and the second support video based on pseudo-action classes.

Example 8 is the method of example 7, wherein the pseudo-action classes are mapped to a k-means cluster.

Example 9 is an apparatus, comprising: one or more memories, individually or in combination, comprising instructions; and one or more processors, individually or in combination, configured to execute the instructions to cause the apparatus to perform a method in accordance with any one of examples 1-8.

Example 10 is an apparatus comprising means for performing a method in accordance with any one of examples 1-8.

Example 11 is a non-transitory computer-readable medium comprising instructions that, when executed by an apparatus, cause the apparatus to perform a method in accordance with any one of examples 1-8.

What is claimed is:

1. An apparatus for performing common-action localization, comprising:

one or more memories, individually or in combination, having instructions; and one or more processors, individually or in combination, configured to execute the instructions and cause the apparatus to:

receive a query video comprising a plurality of frames, wherein a first query proposal is determined based on a subset of frames of the plurality of frames, the first query proposal indicative of an action depicted on the subset of frames;

compute relevance of the first query proposal to each support video of a plurality of support videos, individually one at a time, wherein the computing comprises:

determining a first attendance indicative of a first probability that the action is found in a first support video of the plurality of support videos by generating and up-sampling, via at least one neural network, at least one feature map associated with the first support video; and determining a second attendance indicative of a second probability that the action is found in a second support video of the plurality of support videos by generating and up-sampling, via the at least one neural network, at least one feature map associated with the second support video, wherein the second attendance is determined after the first attendance is determined; and

output a classification of the subset of frames based at least in part on the first attendance and the second attendance.

2. The apparatus of claim 1, wherein the second attendance is determined independent of the first attendance.

3. The apparatus of claim 1, wherein the first attendance is further indicative of whether the first support video comprises one or more frames matching the first query proposal, and wherein the second attendance is further indicative of whether the second support video comprises one or more frames matching the first query proposal.

4. The apparatus of claim 3, wherein the one or more processors are further configured to cause the apparatus to:

apply a one-dimensional temporal convolution to the one or more frames from each of the first support video and the second support video matching the first query proposal.

5. The apparatus of claim 3, wherein the one or more processors are further configured to cause the apparatus to:

generate a third support video consisting of the one or more frames from each of the first support video and the second support video matching the first query proposal.

6. The apparatus of claim 1, wherein the first query proposal is one of multiple query proposals determined based on the plurality of frames, and wherein the one or more processors are further configured to cause the apparatus to:

determine the first query proposal of the multiple query proposals has a highest probability that the action the first query proposal is indicative of is found among the plurality of support videos, relative to one or more other remaining query proposals of the multiple query proposals that are indicative of one or more other actions.

7. The apparatus of claim 1, wherein the one or more processors are further configured to cause the apparatus to:

classify each of the first support video and the second support video based on pseudo-action classes.

8. The apparatus of claim 7, wherein the pseudo-action classes are mapped to a k-means cluster.

9. A method for performing common-action localization, comprising:

receiving, by one or more processors, a query video comprising a plurality of frames, wherein a first query proposal is determined based on a subset of frames of the plurality of frames, the first query proposal indicative of an action depicted on the subset of frames;

computing, by one or more processors, relevance of the first query proposal to each support video of a plurality of support videos, individually one at a time, wherein the computing comprises:

determining a first attendance indicative of a first probability that the action is found in a first support video of the plurality of support videos by generating and up-sampling, via at least one neural network, at least one feature map associated with the first support video; and determining a second attendance indicative of a second probability that the action is found in a second support video of the plurality of support videos by generating and up-sampling, via the at least one neural network, at least one feature map associated with the second support video, wherein the second attendance is determined after the first attendance is determined; and

outputting, by the one or more processors, a classification of the subset of frames based at least in part on the first attendance and the second attendance.

10. The method of claim 9, wherein the second attendance is determined independent of the first attendance.

11. The method of claim 9, wherein the first attendance is further indicative of whether the first support video comprises one or more frames matching the first query proposal, and wherein the second attendance is further indicative of whether the second support video comprises one or more frames matching the first query proposal.

12. The method of claim 11, wherein the method further comprises:

applying a one-dimensional temporal convolution to the one or more frames from each of the first support video and the second support video matching the first query proposal.

13. The method of claim 11, wherein the method further comprises:

generating a third support video consisting of the one or more frames from each of the first support video and the second support video matching the first query proposal.

14. The method of claim 9, wherein the first query proposal is one of multiple query proposals determined based on the plurality of frames, and wherein the method further comprises:

determining the first query proposal of the multiple query proposals has a highest probability that the action the first query proposal is indicative of is found among the plurality of support videos, relative to one or more other remaining query proposals of the multiple query proposals that are indicative of one or more other actions.

15. The method of claim 9, wherein the method further comprises:

classifying each of the first support video and the second support video based on pseudo-action classes.

16. The method of claim 15, wherein the pseudo-action classes are mapped to a k-means cluster.

17. An apparatus for performing common-action localization, comprising:

means for receiving a query video comprising a plurality of frames, wherein a first query proposal is determined based on a subset of frames of the plurality of frames, the first query proposal indicative of an action depicted on the subset of frames;

means for computing relevance of the first query proposal to each support video of a plurality of support videos, individually one at a time, wherein the computing comprises:

determining a first attendance indicative of a first probability that the action is found in a first support video of a plurality of support videos by generating and up-sampling, via at least one neural network, at least one feature map associated with the first support video; and determining a second attendance indicative of a second probability that the action is found in a second support video of the plurality of support videos by generating and up-sampling, via the at least one neural network, at least one feature map associated with the second support video, wherein the second attendance is determined after the first attendance is determined; and means for outputting a classification of the subset of frames based at least in part on the first attendance and the second attendance.

18. The apparatus of claim 17, wherein the second attendance is determined independent of the first attendance.

19. The apparatus of claim 17, wherein the first attendance is further indicative of whether the first support video comprises one or more frames matching the first query proposal, and wherein the second attendance is further indicative of whether the second support video comprises one or more frames matching the first query proposal.

20. The apparatus of claim 19, wherein the apparatus further comprises:

means for applying a one-dimensional temporal convolution to the one or more frames from each of the first support video and the second support video matching the first query proposal.

21. The apparatus of claim 19, wherein the apparatus further comprises:

means for generating a third support video consisting of the one or more frames from each of the first support video and the second support video matching the first query proposal.

22. The apparatus of claim 17, wherein the first query proposal is one of multiple query proposals determined based on the plurality of frames, and wherein the apparatus further comprises:

means for determining the first query proposal of the multiple query proposals has a highest probability that the action the first query proposal is indicative of is found among the plurality of support videos, relative to one or more other remaining query proposals of the multiple query proposals that are indicative of one or more other actions.

23. The apparatus of claim 17, wherein the apparatus further comprises:

means for classifying each of the first support video and the second support video based on pseudo-action classes.

24. The apparatus of claim 23, wherein the pseudo-action classes are mapped to a k-means cluster.

25. A non-transitory computer-readable medium comprising computer executable code, the code when executed by one or more processors causes the one or more processors, individually or in combination, to perform operations comprising:

receiving a query video comprising a plurality of frames, wherein a first query proposal is determined based on a subset of frames of the plurality of frames, the first query proposal indicative of an action depicted on the subset of frames;

computing relevance of the first query proposal to each support video of a plurality of support videos, individually one at a time, wherein the computing comprises:

determining a first attendance indicative of a first probability that the action is found in a first support video of the plurality of support videos by generating and up-sampling, via at least one neural network, at least one feature map associated with the first support video; and determining a second attendance indicative of a second probability that the action is found in a second support video of the plurality of support videos by generating and up-sampling, via the at least one neural network, at least one feature map associated with the second support video, wherein the second attendance is determined after the first attendance is determined; and outputting a classification of the subset of frames based at least in part on the first attendance and the second attendance.

26. The non-transitory computer-readable medium of claim 25, wherein the second attendance is determined independent of the first attendance.

27. The non-transitory computer-readable medium of claim 25, wherein the first attendance is further indicative of whether the first support video comprises one or more frames matching the first query proposal, and wherein the second attendance is further indicative of whether the second support video comprises one or more frames matching the first query proposal.

28. The non-transitory computer-readable medium of claim 27, wherein the operations further comprise:

applying a one-dimensional temporal convolution to the one or more frames from each of the first support video and the second support video matching the first query proposal.

29. The non-transitory computer-readable medium of claim 27, wherein the operations further comprise:

generating a third support video consisting of the one or more frames from each of the first support video and the second support video matching the first query proposal.

30. The non-transitory computer-readable medium of claim 25, wherein the first query proposal is one of multiple query proposals determined based on the plurality of frames, and wherein the operations further comprise:

determining the first query proposal of the multiple query proposals has a highest probability that the action the first query proposal is indicative of is found among the plurality of support videos, relative to one or more other remaining query proposals of the multiple query proposals that are indicative of one or more other actions.

* * * * *